United States Patent
Katagiri

[11] Patent Number: 5,772,336
[45] Date of Patent: Jun. 30, 1998

[54] SLIDING BEARING AND A METHOD FOR MOUNTING SAME

[75] Inventor: Masayuki Katagiri, Nagano, Japan

[73] Assignee: Sankyo Seiki Mfg. Co., Ltd., Nagano-ken, Japan

[21] Appl. No.: 792,153

[22] Filed: Jan. 30, 1997

[30] Foreign Application Priority Data

Feb. 2, 1996 [JP] Japan .................................. 8-017660

[51] Int. Cl.$^6$ .................................................. F16C 17/02
[52] U.S. Cl. ................ 384/129; 29/898.054; 29/898.057
[58] Field of Search ....................... 29/898.054, 898.048, 29/898.055, 898.056, 898.057; 384/129

[56] References Cited

U.S. PATENT DOCUMENTS

| | | | |
|---|---|---|---|
| 5,120,091 | 6/1992 | Nakagawa | 29/898.054 |
| 5,120,140 | 6/1992 | Nakagawa et al. | 29/898.054 |
| 5,519,933 | 5/1996 | Sakashita et al. | 29/523 |

*Primary Examiner*—Lenard A. Footland
*Attorney, Agent, or Firm*—McAulay Fisher Nissen Goldberg & Kiel, LLP

[57] ABSTRACT

A method for mounting a sliding bearing comprises the steps of holding a position different in an axial direction from that of a shaft sliding portion of the bearing by a bearing holding member, inserting a sizing bar having almost the same outer diameter as that of a shaft supported by the sliding bearing, into a bearing hole of the bearing and pressing the outer circumference onto the shaft sliding portion of the sliding bearing in a radial direction while the sizing bar is inserted into the bearing hole. A sliding bearing described by the method comprises a portion adapted to being held by a bearing holding member to support a shaft in a radial direction, shaft sliding portions at positions displaced in the axial direction from the portion held by the bearing holding member and a pressing mark formed on the surface of the outer circumference side of the shaft sliding portion.

4 Claims, 4 Drawing Sheets

SLIDING BEARING AND A METHOD FOR MOUNTING SAME

BACKGROUND OF THE INVENTION

1. Field of the Invention

This invention relates to a sliding bearing (hereafter denoted as "a bearing") which rotatably supports a shaft, for example, in a compact motor and the like, and its mounting method.

2. Description of the Related Art

In a device such as a motor comprising a shaft and a bearing which rotatably supports the shaft, a bearing is press-fitted to a bearing holding member such as a rotor case. FIGS. 7 and 8 show a conventional method for mounting bearings.

In a conventional method of mounting a bearing as illustrated in FIG. 7, first a bearing 1 is press-fitted into a cylindrical holding portion 2a formed by bending the periphery of the center hole of a motor case 2 (a bearing holding member) so that it is held by the motor case 2; then, a sizing bar 5 is inserted into the bearing hole of the bearing 1 such that the final inner diameter of the bearing hole of the bearing 1 is almost the same as the outer diameter of the sizing bar 5. The bearing 1 comprises a press-fitted portion 1a press-fitted into the motor case 2 and shaft sliding portions 1b and 1c, whose inner circumference surfaces at both ends in the axial direction support the shaft in a radial direction. The inner diameter of the above mentioned press-fitting portion 1a is larger than the inner diameter of the shaft sliding portions 1b and 1c; the inner diameter of the unfinished shaft sliding portions 1b and 1c is slightly smaller than the outer diameter of the shaft to be rotatably supported by the bearing 1. The outer diameter of the sizing bar 5 is made almost as large as the outer diameter of the shaft to be supported by the bearing 1; the bearing hole of the bearing 1 is given almost the same diameter as the outer diameter of the shaft by inserting the sizing bar 5 into the bearing hole of the bearing 1 as described above.

In a conventional bearing, its inner circumference surface is machined in the above manner to obtain precise inner diameter of the shaft sliding portions 1b and 1c; the inner diameter of the shaft sliding portions 1b and 1c of the bearing 1 is formed smaller than the outer diameter of the sizing bar 5. For this reason, when the sizing bar 5 is inserted into the bearing hole of the bearing 1, an inward stress in a radial direction is generated inside the bearing 1, as illustrated by the arrows in FIG. 7. Another inward stress is also generated in a radial direction when the press-fitting portion 1a is press fitted into the holding portion 2a of the motor case 2. Therefore, when the sizing bar 5 is pulled out of the bearing 1, the inner diameter of the bearing hole of the bearing 1 shrinks due to the above mentioned inward stress in a radial direction.

FIG. 8 illustrates a shrinkage profile. When φ1 is the outer diameter of the sizing bar 5, and φ2 is the inner diameter of the shaft sliding portions 1b and 1c of the bearing 1 after the sizing bar is pulled out, φ1>φ2, that is, the bearing hole of the bearing 1 has shrunk by the amount of φ1−φ2. The level of shrinkage varies due to the different overlay allowance for press-fitting the bearing 1 into the motor case 2, the difference between the inner diameter of the unfinished bearing 1 and the outer diameter of the sizing bar 5, the different rigidity, different machining precision for each component, press-fitting precision capability of machine, and the like; it shrinks from several pm to several tens pm. For this reason, the space between the outer circumference of the shaft and the inner circumference of the bearing 1 varies to a great extent when the shaft is inserted into the bearing hole of the bearing 1. In particular, if the space is too large, the center of the shaft continuously deviates in a radial direction inside the bearing hole as the shaft rotates, thus deteriorating the precision of rotation of the motor.

According to the conventional method for mounting a bearing as described above, when the sizing bar is pulled out of the bearing, the bearing hole of the bearing shrinks due to the inward stress in a radial direction with different levels of shrinkage. For this reason, there is no other way for a bearing to support the shaft precisely than sorting the bearing according to the inner diameter of its bearing hole, and sorting the shaft according to its diameter, then pairing them according to their sizes. Nevertheless, it is difficult to build-in the bearing and the shaft. Building them in for pairing provides poor processability and yield, which results in a high cost. Controlling the space between the inner diameter of the bearing and the outer diameter of the shaft, for example, by a $\mu$m order, requires picking the sizing bar having an outer diameter corresponding to the inner diameter of the bearing, again resulting in poor productivity.

Also, a technology is known as disclosed in U.S. Pat. No. 5,519,933 as a conventional example. According to this technology, a sizing bar having a smaller diameter than the inner diameter of the bearing hole is inserted into the bearing hole, and both ends of the bearing are compressed to mold a smaller diameter portion having the same diameter as the outer diameter of the sizing bar around the inner circumference of the bearing hole. In such a conventional technology, the diameter of the bearing hole expands due to the outward stress in a radial direction caused when the sizing bar is pulled out, and therefore, it is difficult to precisely machine the space between the inner diameter of the bearing hole and the outer diameter of the shaft. Since the sizing bar inserted into the bearing hole is not the shaft to be supported by the bearing and does not have the same diameter as that of the shaft, the bearing and the shaft need respectively to be sorted according to their inner diameter and the outer diameter, and to be paired in order to stabilize the space between the bearing and shaft in a complete assembly.

OBJECT AND SUMMARY OF THE INVENTION

The primary purpose of the present invention is to solve the above problems of the conventional technology and to provide a bearing having a highly precise rotation and mounting method, wherein a predetermined space between the inner circumference of the bearing and the outer circumference of the shaft can be obtained constantly, thereby preventing the center of the shaft inside the bearing hole from deviating in a radial direction (radial play).

A method for mounting a sliding bearing in accordance with the invention comprises the steps of holding a position different in an axial direction from that of a shaft sliding portion of the bearing by a bearing holding member, inserting a sizing bar having almost the same outer diameter as that of a shaft supported by the sliding bearing, into a bearing hole of the bearing and pressing the outer circumference onto the shaft sliding portion of the sliding bearing in a radial direction while the sizing bar is inserted into the bearing hole.

DESCRIPTION OF THE PREFERRED EMBODIMENTS

Embodiments of a bearing of this invention and its mounting method are described hereinafter referring to FIGS. 1 through 6. Note that identical elements as those of the above mentioned conventional example use the same element designations.

Figure 1:
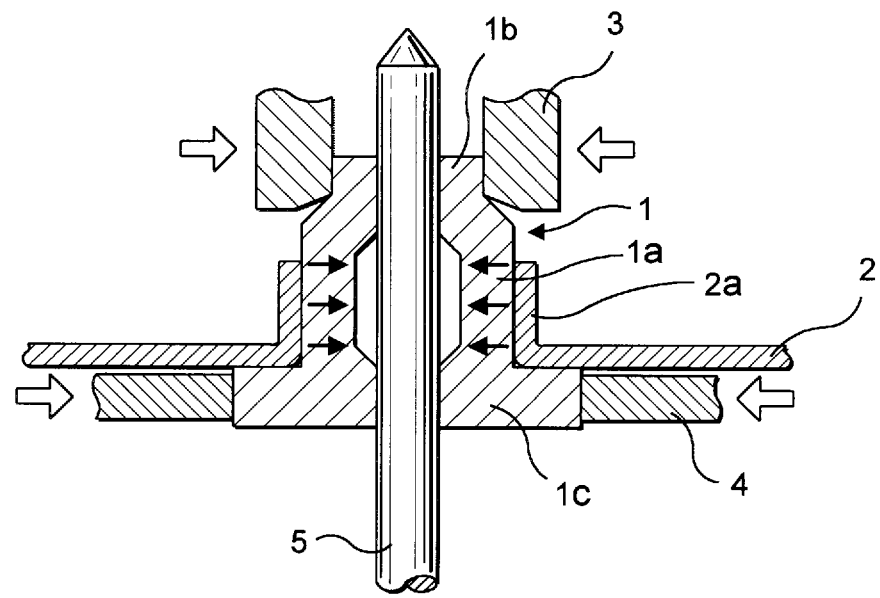
FIG. 1 is a cross sectional view showing an embodiment of a bearing of this invention and a method for mounting it.
Figure 3:
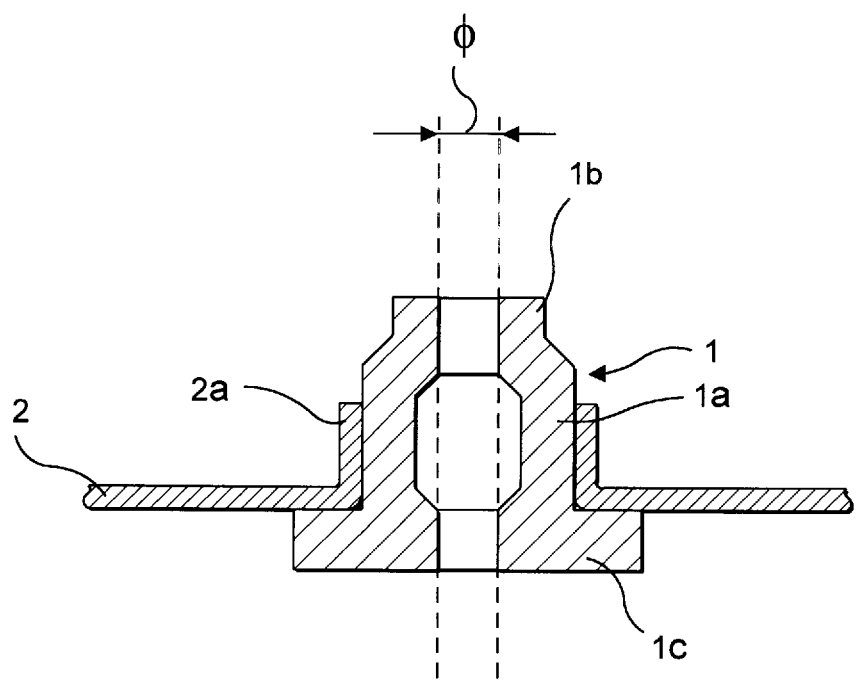
FIG. 3 is a cross sectional view of the bearing of the above embodiment.
Figure 2:
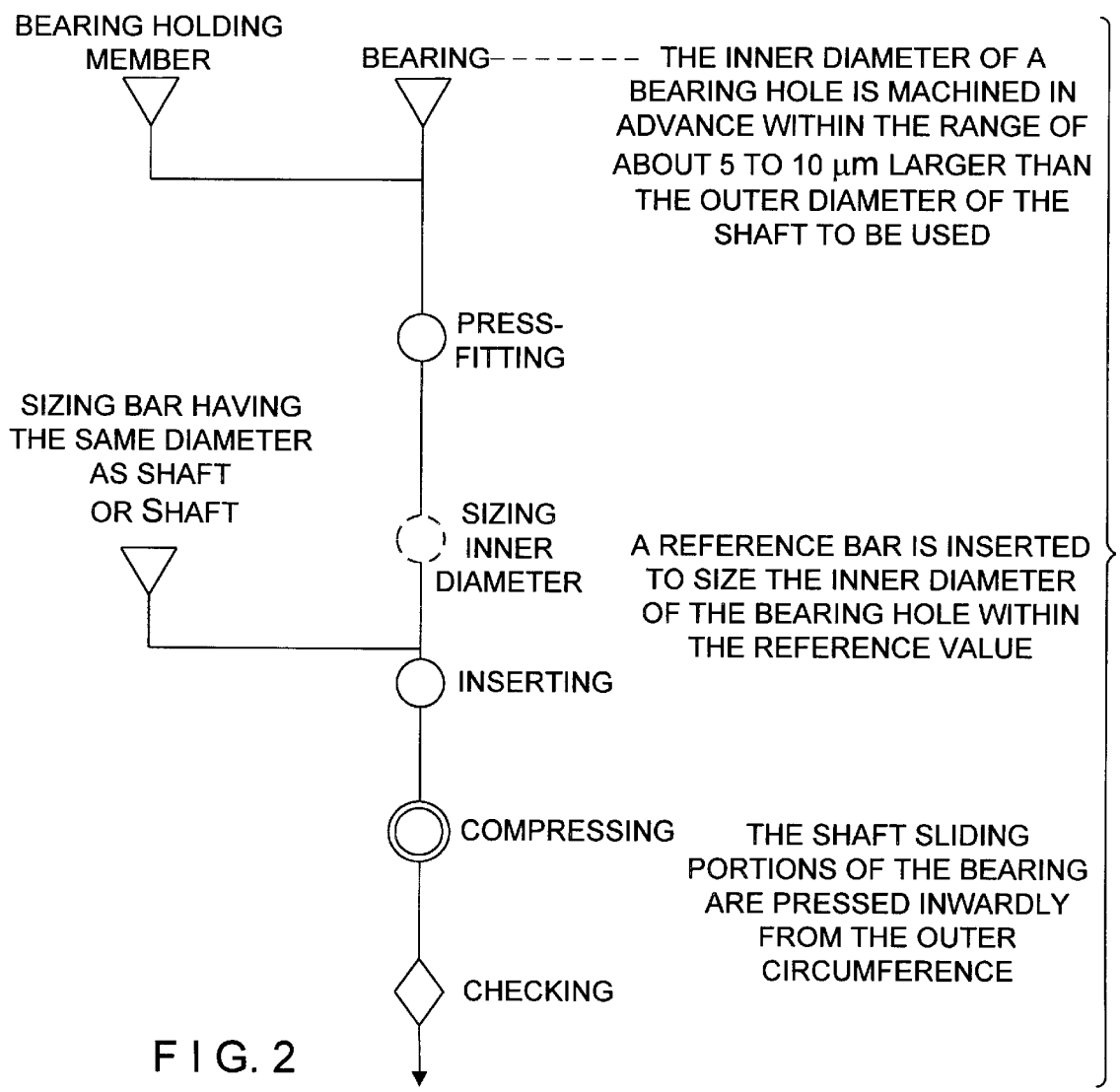
FIG. 2 is a process diagram showing an embodiment of a bearing of this invention and a method for mounting it.

FIG. 1 illustrates an embodiment of a bearing of this invention and its mounting method. FIG. 2 is a process diagram of the mounting method. In this process, first a bearing 1 is press fitted into a cylindrical holding portion 2a which is made by drawing the center hole circumference of a motor case 2 (a bearing holding member) so that it is held by the motor case 2. At that time, the holding portion 2a holds the bearing 1 by a position different in the axial direction from the shaft sliding portion.

Note that the bearing 1 is an oil impregnated sintered bearing which is made by sintering pressured powder mainly comprising copper powder, iron powder, or a mixture of these two to a predetermined shape, and by impregnating a lubricant oil into the sintered pressured powder.

Next, though not illustrated in FIG. 1, a reference bar having a slightly larger diameter than that of a shaft to be inserted later is inserted into a bearing hole of the bearing 1 to machine the inner diameter of the bearing hole of the bearing 1 to be almost the same size as the outer diameter of the reference bar. Consequently, the inner diameter of the bearing hole of the bearing 1 is sized in advance within the range of about 5 to about 10 μm larger than the outer diameter of the shaft to be used, and the uneven inner circumference surface is smoothed. Note that this process of unifying the inner diameter can be omitted.

Next, a sizing bar 5 having almost the same outer diameter as that of the shaft to be supported by the bearing 1, or a shaft having a rotor core integrally which is actually used is inserted. Maintaining the sizing bar 5 or the shaft being inserted, the outer circumference of the shaft sliding portions 1b and 1c of the bearing 1 is compressed in a radial direction for plastic deformation. In this compression process, as illustrated in FIG. 1, while the sizing bar 5 is inserted into the bearing hole of the bearing 1, the outer circumference of the shaft sliding portion 1b on the side opposite the output shaft (the upper side in the figure) of the bearing 1 is pressed in a radial direction by a draw puncher 3 for plastic deformation, and the outer circumference of the shaft sliding portion 1c on the side of output shaft (the lower side in the figure) of the bearing 1 is pressed in a radial direction by a draw puncher 4 for plastic deformation. The entire periphery may be pressed circumferencially or a plurality of points may be pressed.

In such a manner, pressing the outer circumference of the shaft sliding portions 1b and 1c of the bearing 1 in a radial direction by the draw punchers 3 and 4 generates an outward stress (springback) in a radial direction at the above mentioned shaft sliding portions 1b and 1c, and therefore, the inward stress in a radial direction from the sizing bar press-fitted into the bearing holding portion 2a of the motor case 2 is canceled. As a result, regardless of the variations in diameter of bearing hole (as a single unit) of the bearing 1, the diameter φ of the bearing hole of the bearing 1 can be finished to obtain a value close to the outer diameter of the sizing bar 5 when the sizing bar 5 is pulled out of the bearing 1, as illustrated in FIG. 2; this eliminates the effort to select the sizing bar having the outer diameter corresponding to the diameter of the bearing hole as a single unit in the bearing 1. It also eliminates an elaborate process of sorting the bearing 1 and the shaft according to the level of shrinkage of the bearing hole and their diameters, then to pair the bearing 1 and shaft according to this sorting.

Note that the pressure toward the outer circumference of the shaft sliding portions 1b and 1c of the bearing 1 caused due to the draw punchers 3 and 4 may be set such that the level of inward shrinkage in a radial direction caused when the sizing bar 5 is pulled out of the bearing 1 balances the level of expansion due to the outward stress in a radial direction caused when the draw punchers 3 and 4 are released from the shaft sliding portions 1b and 1c of the bearing 1. Consequently, since the inner diameter of the shaft sliding portions 1b and 1c of the bearing 1 is precisely and stably set to a value close to the outer diameter of the sizing bar 5, a bearing 1 having a highly precise inner diameter can be manufactured with excellent yield. It is particularly preferable to use the pressure range of about 50 kgf/cm² to about 100 kgf/cm². If a pressure outside of this range is applied, the level of inward shrinkage does not balance the level of outward expansion, varying the inner diameters of the bearing hole.

It is also preferable that the space between the inner circumference surface of the shaft sliding portion of the bearing 1 and the outer circumference surface of the shaft is set from about 1 μm to about 4 μm. When the space is less than 1 μm, the bearing loss is generated, causing a baking phenomenon; when the space is more than 4 μm, it is too wide, causing a radial play and a deteriorated precision of rotation.

The bearing 1 mounted by the above mentioned method, has the shaft sliding portions 1b and 1c at positions displaced in the axial direction from the portion 1a which is held by the holding portion 2a of the motor case 2; because the outer circumference of the shaft sliding portions 1b and 1c are pressed by the draw punchers 3 and 4, the pressing marks are left on the surface thereon. In a manufacturing process of the bearing, one can easily determine whether or not the pressing process is done by observing the pressing marks on the bearing with the eyes.

Figure 4:
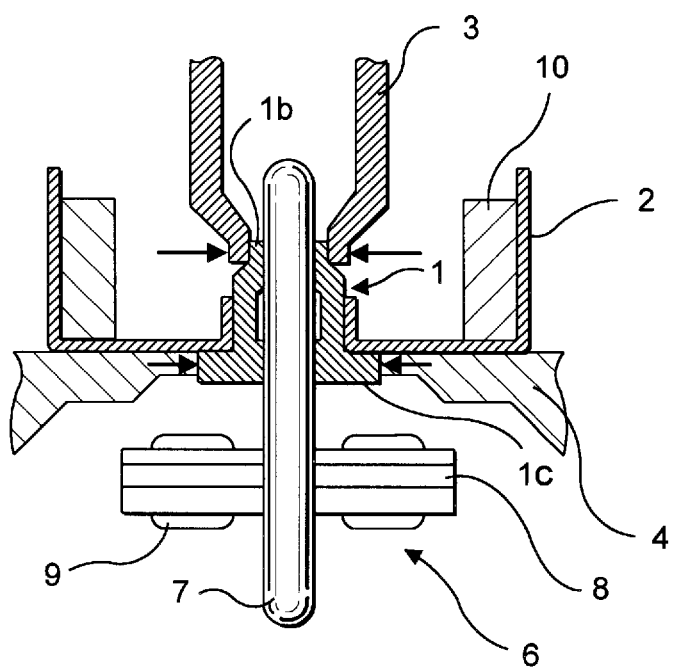
FIG. 4 is a cross sectional view showing another embodiment of a bearing of this invention and a method for mounting it.

In the above described method for mounting a bearing, a shaft to be supported by the bearing 1 can be used in place of the sizing bar 5. FIG. 4 illustrates the embodiment, showing a part of assembly process of a motor. In FIG. 4, the bearing 1 is press fitted onto the periphery of the center hole of the motor case 2 (a bearing holding member) so that it is held by the motor case 2; then, a shaft 7 of the motor in place of the sizing bar is inserted into the bearing hole of the bearing 1. The shaft 7 is a bearing to be supported by the bearing 1 after the motor is assembled. While the shaft 7 is inserted into the bearing hole of the bearing 1 in this manner, the outer circumference of the shaft sliding portions 1b and 1c of the bearing 1 are pressed by the draw punchers 3 and 4 for plastic deformation. Consequently, outward springback occurs in a radial direction, and the inward stress generated in a radial direction inside the bearing 1 is canceled; when the shaft 7 is pulled out of the bearing 1, the diameter of the bearing hole of the bearing 1 is finished to a value close to the outer diameter of the shaft 7.

Note that the shaft 7 is formed integral with a rotor core 8 press-fitted thereto; a drive coil 9 is wound around a plurality of salient-poles formed in the rotor core 8. The shaft 7, rotor core 8, and drive coil 9 constitute a rotor 6 of the motor. The rotor core 8 is normally arranged inside the motor case 2. If the rotor core 8 is inside the motor case 2 when sizing, however, it is difficult to draw punch (press) the shaft sliding portion 1b on the side opposite the output shaft of the bearing 1 by the draw puncher 3. Therefore, the shaft 7 is inserted inversely with respect to the bearing 1, and then the outer circumference of the shaft sliding portions 1b and 1c of the bearing 1 are draw punched (pressed) in a radial direction by the draw punchers 3 and 4. The shaft 7 is then temporarily pulled out of the bearing 1 to be vertically reversed, and is inserted into the bearing hole of the bearing 1 from the top in FIG. 4, and then the rotor 6 is stored inside the rotor case 2. By using the shaft 7 supported by the bearing, the space between the bearing hole and the shaft 7 is fixed in a final motor; therefore, radial play does not occur with the shaft 7, thus improving precision or rotation.

Figure 5:
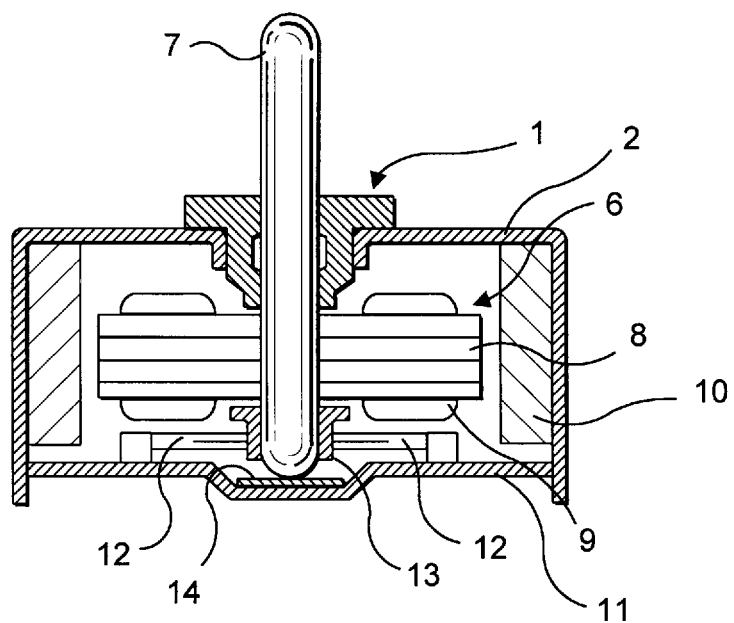
FIG. 5 is a cross sectional view showing an example of a motor to which the bearing of the above embodiment is applied.
Figure 7:
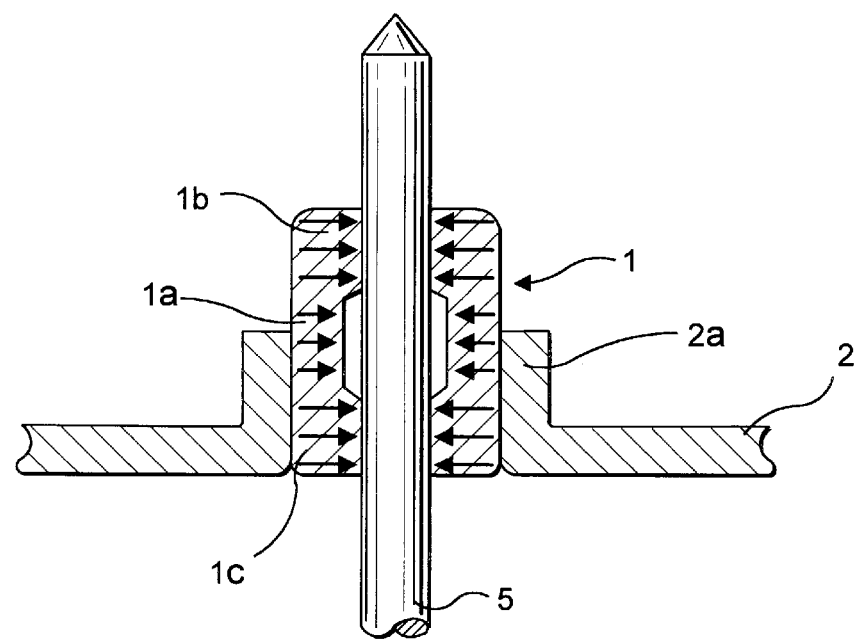
FIG. 7 is a cross sectional view showing an example of a conventional mounting method for a bearing.
Figure 8:
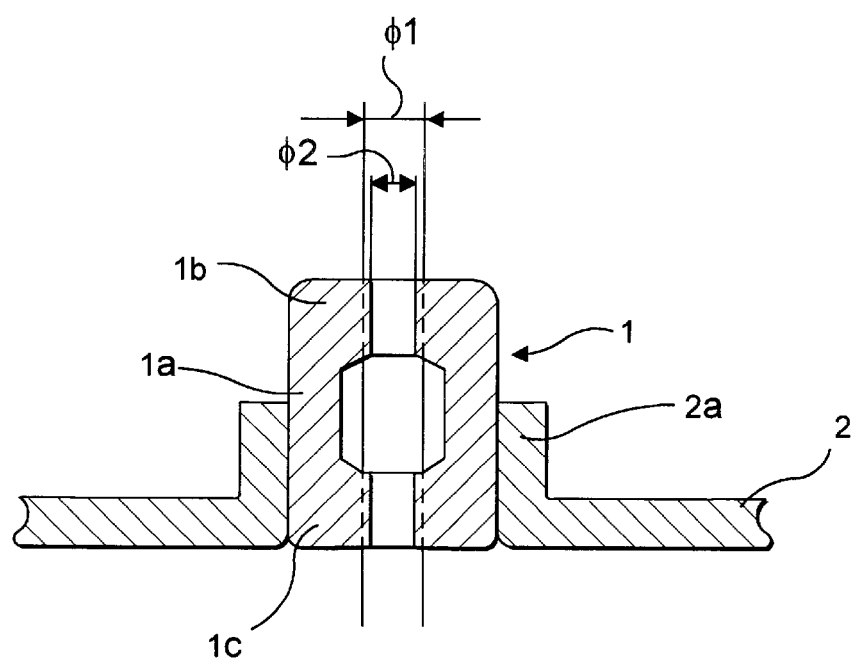
FIG. 8 is a cross sectional view showing an example of a bearing mounted by a conventional mounting method.

An embodiment of a motor assembled in such a way is illustrated in FIG. 5. In FIG. 5, a cylindrical drive magnet 10 is secured onto the inner circumference surface of the peripheral wall of the cup-like motor case 2. The shaft 7 constituting a part of the rotor 6 is inserted into the bearing hole of the bearing 1 which is press fitted into a center hole of the motor case 2, and one end of the bearing 1 functioning as an output shaft projects outside the motor case 2. The bearing 1 supports the shaft 7 in a radial direction. The open end of the motor case 2 is covered with an end plate 11. In the center of the end plate 11 is formed a thrust bearing 14, and one end of the shaft 7 makes contact therewith. The rotor 6 is stored inside the motor case 2, and the edge of each salient-pole of the rotor core 8 faces the inner circumference surface of the drive magnet 10, with an appropriate space therebetween. A pair of brushes 12 are supported by the end plate 11; they abrasively contact the outer circumference surface of a commutator provided on the outer circumference of the shaft 7. The rotor is rotated by a publicly known rotation principle.

Figure 6:
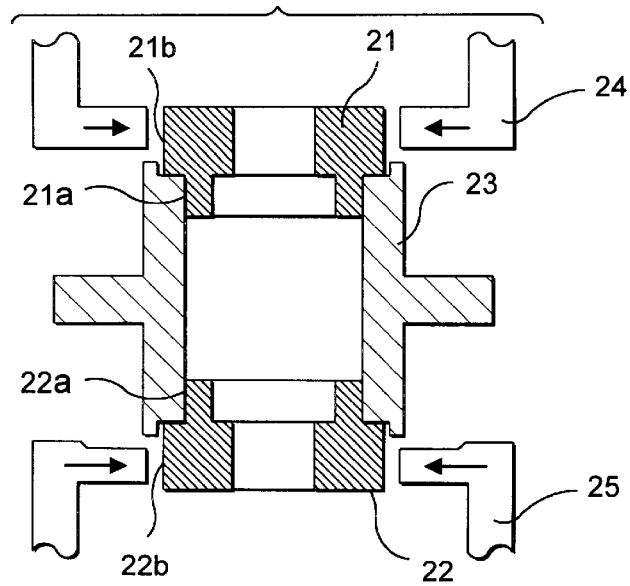
FIG. 6 is a cross sectional view showing another embodiment of a bearing of this invention and a method for mounting it.

The bearing and the mounting method of this invention can be applied to a bearing of top-bottom separated units as illustrated in FIG. 6. In FIG. 6, to the inner circumference of both ends of a cylindrical bearing holder 23 (a bearing holding member), smaller diameter sections 21a and 22a of bearings 21 and 22 which are consisted of smaller diameter sections 21a and 22a and larger diameter sections 21b and 22b respectively as their outer diameters, are fixed by press-fitting; the larger diameter sections 21b and 22b of the bearings 21 and 22 are projected from the ends of the bearing holder 23. Each of the bearings 21 and 22 has the inner diameters having reversed relationship of smaller and larger diameter sections with respect to those of the outer diameter. In other words, at the smaller diameter sections 21a and 22a of the outer diameter, the inner diameter is larger; at the larger diameter sections 21b and 22b of the outer diameter, the inner diameter is smaller. This portion having a larger outer diameter and a smaller inner diameter is a shaft sliding portion; its inner circumference surface abrasively contacts the outer circumference surface of the shaft. The sizing bar or the shaft to be supported by the bearing 21 and 22 is inserted into the bearing hole of the bearings 21 and 22; at this time, the outer circumference of the shaft sliding portions of the bearings 21 and 22 which are projected form each end of the bearing holder 23 are respectively pressed by draw punchers 24 and 25 for plastic deformation. Consequently, in the same manner as in the previous embodiment, the outward stress is generated in a radial direction at the shaft sliding portions of the bearing 21 and 22, and the inward stress generated in a radial direction when the sizing bar or the shaft is inserted into the motor case 2 (the bearing holding member) is canceled. Therefore, when the sizing bar or the shaft is pulled out of the bearings 21 and 22, the diameter of the bearing holes of the bearings 21 and 22 are finished to a value close to the outer diameter of the sizing bar or the shaft, providing the same operation effects as the aforementioned embodiment. Moreover, the coaxiality of both bearings 21 and 22 is excellent.

The invention created by this inventor has been described in detail based on the embodiments in the above; however, this invention is not limited to the above embodiments, but needless to say, it is modifiable within the range of the scope of this invention. For example, in the above embodiment, the bearing supporting the shaft of the motor has been described, but this invention can be applied to any device other than a motor having a shaft and a bearing which rotatably supports the shaft.

According to this invention, by pressing the outer circumference of the shaft sliding portions of the bearing for plastic deformation, the outward stress is generated in a radial direction at the shaft sliding portions, and the inward stress in a radial direction generated when the sizing bar is press-fitted into the bearing holding member is canceled. Therefore, when the sizing bar is pulled out of the bearing, the bearing hole of the bearing is sized to a diameter close to the outer diameter of the sizing bar. For this reason, this eliminates the effort to select a sizing bar having an outer diameter corresponding to the diameter of the bearing hole (as a single unit) of the bearing, to sort the bearing and the shaft according to the level of shrinkage of the bearing hole and the diameter, or to pair the bearing and shaft according to the sorting, thus contributing to a lower cost.

When a shaft to be supported by the bearing is used in place of the sizing bar as in this invention, the diameter of the bearing hole of the bearing can be finished to a value close to the outer diameter of the shaft which the bearing actually supports. Therefore, the space between the inner circumference surface of the bearing and the outer circumference surface of the shaft can be precisely and stably sized to a predetermined spacing.

While the foregoing description and drawings represent the preferred embodiments of the present invention, it will be obvious to those skilled in the art that various changes and modifications may be made therein without departing from the true spirit and scope of the present invention.

What is claimed is:

1. A method for mounting a sliding bearing, comprising the following steps:

holding a position different in an axial direction from that of a shaft sliding portion of said bearing by a bearing holding member;

inserting a sizing bar having almost the same outer diameter as that of a shaft supported by said sliding bearing, into a bearing hole of said bearing; and pressing the outer circumference onto said shaft sliding portion of said sliding bearing in a radial direction while said sizing bar is inserted into said bearing hole.

2. A method for mounting a sliding bearing as set forth in claim 1, wherein in said inserting step, said sizing bar is a shaft to be supported by said sliding bearing.

3. A method for mounting a sliding bearing as set forth in claim 1, wherein in said pressing step, the force pressing the outer circumference around said shaft sliding portion of said bearing in a radial direction is a stress with which the level of inward shrinkage in a radial direction caused when said sizing bar is pulled out of said bearing hole almost balances the level of outward expansion in a radial direction after the stress is added to the outer circumference of said shaft sliding portion.

4. A method for mounting a sliding bearing as set forth in claim 3, wherein in said pressing step, the outer circumference of said shaft sliding portion of said sliding bearing is pressed at about 50 kgf/cm$^2$ to about 100 kgf/cm$^2$.

* * * * *